(12) United States Patent
Sangireddy et al.

(10) Patent No.: US 11,037,343 B2
(45) Date of Patent: Jun. 15, 2021

(54) DIGITAL VISUALIZATION OF PERIODICALLY UPDATED IN-SEASON AGRICULTURAL FERTILITY PRESCRIPTIONS

(71) Applicant: THE CLIMATE CORPORATION, San Francisco, CA (US)

(72) Inventors: Harish Sangireddy, San Francisco, CA (US); Kofikuma Dzotsi, San Francisco, CA (US); Juan Lopez Arriaza, San Francisco, CA (US); John Gates, San Francisco, CA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 514 days.

(21) Appl. No.: 16/048,062

(22) Filed: Jul. 27, 2018

(65) Prior Publication Data

US 2019/0347836 A1 Nov. 14, 2019

Related U.S. Application Data

(60) Provisional application No. 62/670,707, filed on May 11, 2018.

(51) Int. Cl.
*G06T 11/20* (2006.01)
*G06Q 50/02* (2012.01)
(Continued)

(52) U.S. Cl.
CPC .......... *G06T 11/206* (2013.01); *A01C 21/005* (2013.01); *A01C 21/007* (2013.01);
(Continued)

(58) Field of Classification Search
CPC .................................................. G06T 11/206
(Continued)

(56) References Cited

U.S. PATENT DOCUMENTS 5,751,576 A * 5/1998 Monson ............... A01B 79/005
239/161
5,771,169 A * 6/1998 Wendte ............... A01B 79/005
702/5

(Continued)

OTHER PUBLICATIONS

The International Searching Authority, "Search Report" in application No. PCT/US2019/029989, dated Jul. 15, 2019, 11 pages.

(Continued)

*Primary Examiner* — David T Welch
(74) *Attorney, Agent, or Firm* — Hickman Becker Bingham Ledesma LLP; Malgorzata A. Kulczycka

(57) ABSTRACT

Display of graphical maps of agricultural fields, coded with color or other indicators of values of data pertaining to agronomy at high resolution, and updated on a daily basis or on demand by recalculating agronomy models with the high-resolution data, is disclosed. Map displays may include multiple layers that relate to different agronomy metrics, and GUI widgets that are programmed to receive selection of values indicating different field properties or layers to display. In an embodiment, a computer-implemented data processing method providing an improvement in efficient calculation of digital data representing physical properties of agricultural fields, the method comprising receiving digital input specifying a request to display a map image of a specified agricultural field for a particular day; in response to receiving the input, calculating an interpolated digital image of the specified agricultural field with a plurality of different field properties, by: dividing a digital map of the specified field into a plurality of grids each having a same size and a same area; obtaining, from digital storage, a plurality of data for the different field properties and assigning the data as covariates; grouping the grids into a specified number of clusters based on values of the covariates; pseudo-randomly selecting a specified number of one or (Continued)

more sample values in each of the clusters; evaluating a digital fertility model using the sample values and storing a plurality of output values from the digital fertility model; interpolating a plurality of model values for the grids; generating and causing displaying a visual graphical image of the specified agricultural field including color pixels corresponding to each of the model values.

22 Claims, 15 Drawing Sheets

(51) Int. Cl.
*A01C 21/00* (2006.01)
*G06T 11/00* (2006.01)
*G06F 3/0484* (2013.01)

(52) U.S. Cl.
CPC ......... *G06F 3/04847* (2013.01); *G06Q 50/02* (2013.01); *G06T 11/001* (2013.01); *G06T 2200/24* (2013.01)

(58) Field of Classification Search
USPC .......................................................... 706/46
See application file for complete search history.

(56) References Cited

U.S. PATENT DOCUMENTS

| | | | | |
|---|---|---|---|---|
| 5,870,689 A * | 2/1999 | Hale | .................... | A01B 79/005 |
| | | | | 702/5 |
| 5,878,371 A * | 3/1999 | Hale | .................... | A01B 79/005 |
| | | | | 702/5 |
| 5,902,343 A * | 5/1999 | Hale | .................... | A01B 79/005 |
| | | | | 342/357.52 |
| 5,978,723 A * | 11/1999 | Hale | .................... | A01B 79/005 |
| | | | | 701/409 |
| 6,029,106 A * | 2/2000 | Hale | .................... | A01B 79/005 |
| | | | | 342/357.52 |
| 6,041,582 A * | 3/2000 | Tiede | .................... | A01B 79/005 |
| | | | | 56/10.2 A |
| 6,236,907 B1 * | 5/2001 | Hauwiller | ............ | A01B 79/005 |
| | | | | 111/200 |
| 8,412,419 B1 | 4/2013 | Seamon et al. | | |
| 10,768,156 B1 * | 9/2020 | Baron | ................ | G01N 33/0098 |
| 2012/0201415 A1 * | 8/2012 | Bredehoft | .......... | G06K 9/00657 |
| | | | | 382/100 |
| 2012/0237083 A1 * | 9/2012 | Lange | .................... | G06F 16/29 |
| | | | | 382/103 |
| 2014/0035752 A1 | 2/2014 | Johnson | | |
| 2017/0041407 A1 | 2/2017 | Wilbur et al. | | |
| 2017/0042081 A1 * | 2/2017 | Zumbach | ................. | G01N 1/08 |
| 2017/0061052 A1 | 3/2017 | Gates et al. | | |
| 2018/0046735 A1 | 2/2018 | Xu et al. | | |
| 2018/0077857 A1 * | 3/2018 | Tomizawa | ............. | G06Q 50/02 |
| 2018/0077858 A1 * | 3/2018 | Tomizawa | ........... | A01B 79/005 |
| 2018/0300342 A1 * | 10/2018 | Hundley | ............. | G06F 16/9577 |

OTHER PUBLICATIONS

Current Claims in application No. PCT/US2019/029989, dated Jul. 2019, 3 pages.
International Searching Authority, "Preliminary Report on Patentability" in application No. PCT/US2019/029989, dated Nov. 17, 2020, 4 pages.
Current Claims in application No. PCT/US2019/029989, dated Nov. 2020, 3 pages.

\* cited by examiner

Fig. 2
(a)
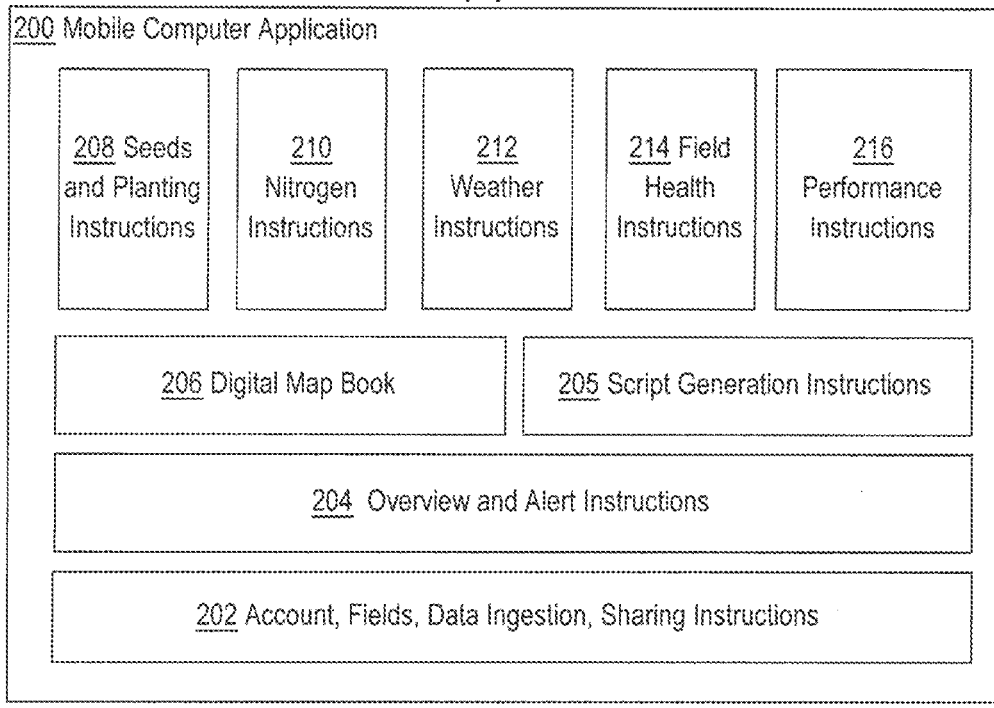
(b)
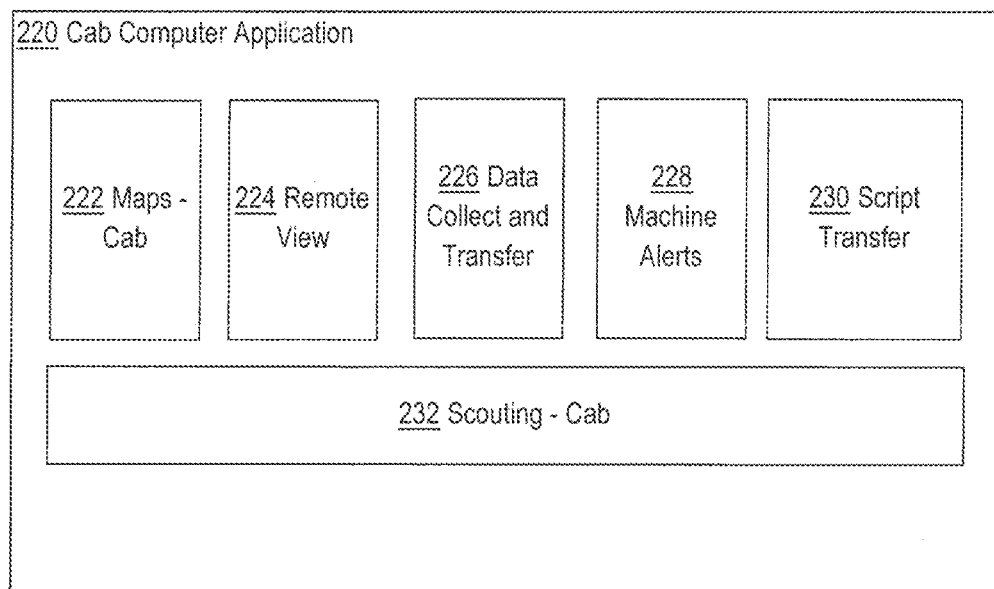

Data Manager

| | Nitrogen | Planting | Practices | Soil | |
|---|---|---|---|---|---|

Planting 1 (4 Fields)
Crop Corn Product
Plant Date: 2016-04-12
ILU 112 | Pop: 34000
[Edit] [Apply]

Planting 2 (0 Fields)
Crop Corn Product
Plant Date: 2016-04-15
ILU 83 | Pop: 34000
[Edit] [Apply]

Planting 3 (0 Fields)
Crop Corn Product
Plant Date: 2016-04-13
ILU 83 | Pop: 34000
[Edit] [Apply]

Planting 4 (1 Fields)
Crop Corn Product
Plant Date: 2016-04-13
ILU 112 | Pop: 34000
[Edit] [Apply]

[+ Add New Planting Plan]

| | | CROP | PLANTED ACRES | PRODUCT | RELATIVE MATURITY | TARGET YIELD | POPULATION (AVG) | PLA... |
|---|---|---|---|---|---|---|---|---|
| ☐ | Select All | | | | | | | |
| ☐ | Ames, IA 1 — Corn \| 100 \| Boone, IA | Corn | --- | DMC82-M | 112 | 160 | 34000 | Apr |
| ☐ | Austin, MN 1 — Corn \| 100 \| Fredricks, MN | Corn | --- | DMC82-M | 114 | 160 | 36000 | Apr |
| ☐ | Boone, IN 1 — Corn \| 100 \| Boone, IA | Corn | --- | DMC82-M | 112 | 150 | 34000 | Apr |
| ☐ | Champaign 1 — Corn \| 100 \| Champaign, IL | Corn | --- | --- | 112 | 200 | 34000 | Apr |
| ☐ | E Nebraska 1 — Corn \| 100 \| Burt, NE | Corn | --- | --- | 112 | 160 | 34000 | Apr |

*FIG. 6*

DIGITAL VISUALIZATION OF PERIODICALLY UPDATED IN-SEASON AGRICULTURAL FERTILITY PRESCRIPTIONS

BENEFIT CLAIM

This application claims the benefit under 35 U.S.C. 119(e) of provisional application 62/670,707, filed May 11, 2018, the entire contents of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2018 The Climate Corporation.

FIELD OF THE DISCLOSURE

One technical field of the present disclosure is computer-assisted visualization of geophysical data in the field of agriculture, such as images of crop fields with colorization of crops, water, soil characteristics and nutrient applications. Another technical field is computer-implemented mathematical techniques for interpolating high spatial resolution datasets based on a small number of input representative data points.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Precision agriculture involves management of agronomy on a sub-field basis. In past approaches, management decisions on application of fertilizer or other interventions have been based upon zones, which are time-invariant parts of a field. Typically, these zones are relatively large in comparison to the resolution of available satellite imagery; a grower might be able to differentially treat the northeast quadrant of a field from the southwest quadrant. However, contemporary growers desire much finer control yet there is no current tool for managing fields nearly pixel-by-pixel with respect to satellite imagery. The ability to do so would involve fewer gross assumptions about the field and would permit using all variability present in the field. Computational problems have limited the ability to do this; for example, different satellite imagery and other field data for different metrics has different resolutions, and the resulting computer-implemented models of field characteristics or behavior become complex and computationally infeasible for regular display.

In agriculture, application of fertilizer to fields or crops in the field may be performed during the growing season. However, current computer-aided tools for recommending fertility application typically are independent from information on in-season conditions of crop, soil and weather. Therefore, in current practice, adapting management plans is difficult and growers may incur unnecessary costs for unneeded applications and/or experience less yield than is otherwise possible, or other adverse effects.

Furthermore, known software tools may provide in-season weather models enhanced with other data, but these tools are not believed to provide rapid updating of field visualization because necessary data is not available. Growers ideally want to view computer displays showing field geometry with overlays or coding to show soil conditions, the appearance of crop coverage in visible light, as-harvested yield data, as-applied fertilizer data, elevation and other data. A special need exists for in-season application of nitrogen given the environmental mobility of nitrogen in response to unexpected events such as high rainfall. Existing satellite imagery data may be obtained only every few days, due to variations in the overhead location of orbiting satellites. Consequently, there is an unfulfilled need in this technical area for tools that permit daily visualization of field conditions with up-to-date data relating to crop coverage or growth stage, water conditions, soil conditions and other metrics.

Moreover, there is an acute need for computational means to match all available data layers at native resolution with speed sufficient to permit large numbers of growers to obtain daily views of all their fields.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 9 illustrates an example computer-generated screen display to show an overview of metric data as an overlay.

DETAILED DESCRIPTION

Figure 1:
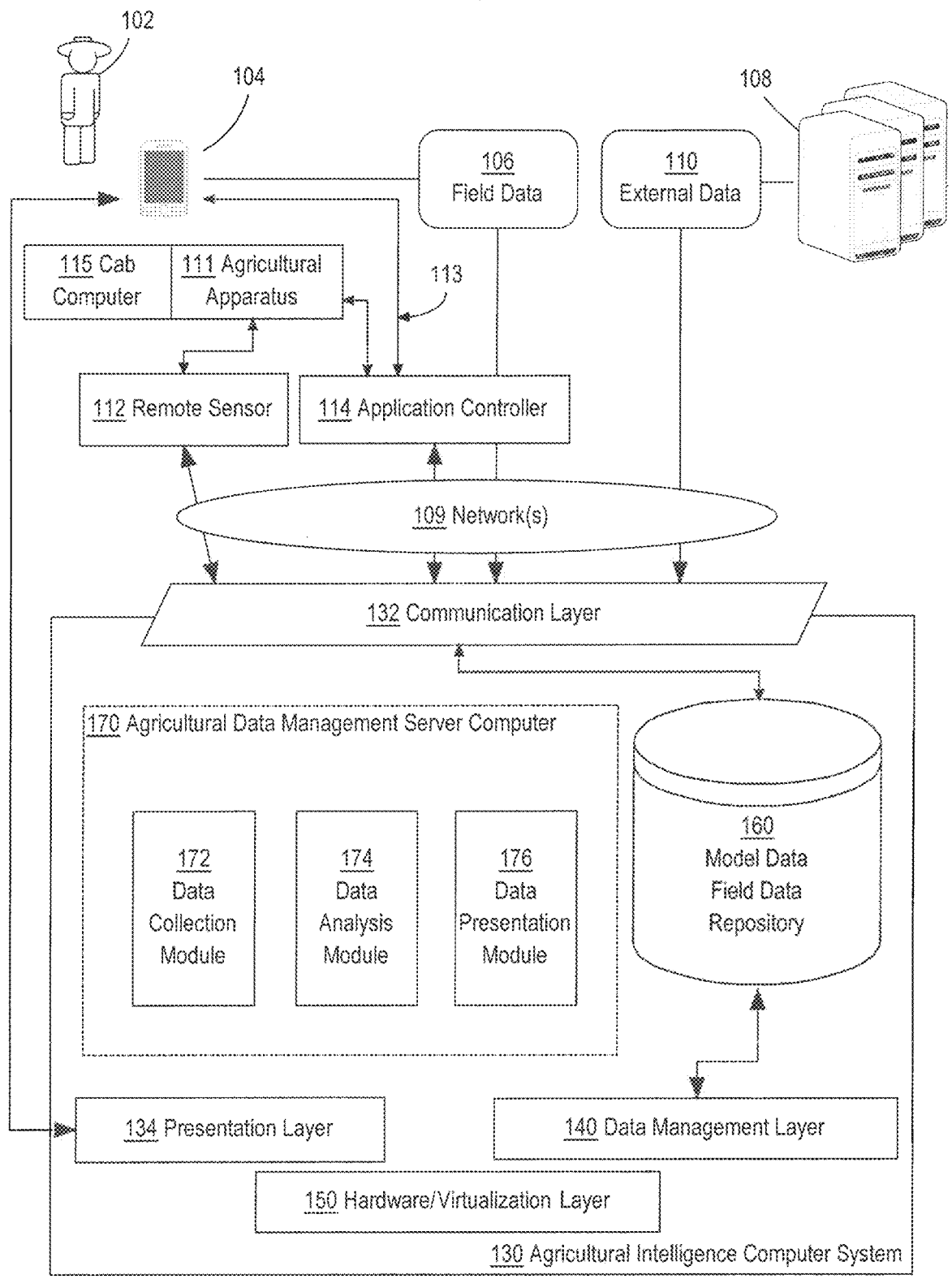
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
  2.1. STRUCTURAL OVERVIEW
  2.2. APPLICATION PROGRAM OVERVIEW
  2.3. DATA INGEST TO THE COMPUTER SYSTEM
  2.4. PROCESS OVERVIEW—AGRONOMIC MODEL TRAINING
  2.5. IMPLEMENTATION EXAMPLE—HARDWARE OVERVIEW
3. PERIODICALLY UPDATED VISUALIZATION TECHNIQUES
4. GRIDDED FERTILITY MODEL
5. EXTENSIONS AND ALTERNATIVES

1. General Overview

Fertility application decisions for in-season applications can benefit by taking into account information on in-season conditions of crop, soil and weather. By doing so, management plans can be adapted and fine-tuned to reduce costs on unneeded applications, increase yield with target applications where they are needed, or both.

Embodiments provide a system for creating and visualizing in-season fertility prescriptions that continuously update with the latest weather and crop conditions. Embodiments provide is a computer-implemented process to produce a continuously-refreshing prescription ("live script") that evolves each day of the growing season. In an embodiment, for any specified day, a prescription can be exported and executed, allowing a grower to nimbly respond to evolving field conditions. In an embodiment, a computer-implemented process also allows users to visualize 1) the prescription layer, 2) a future forecast of the prescription for the next several days, and 3) any spatial data layers that affect and explain the prescription, including static properties such as soil properties and dynamic conditions such as soil nutrient availability or soil moisture.

In an embodiment, for any specified day, a user can visualize a number of data layers across their field, including nutrient status, crop nutrient stress conditions, recent nutrient loss amounts, and so on. In an embodiment, data layers are mapped at the finest resolution available from input data; examples include 1 $m^2$ resolution, which results in thousands of pixels across a typical field size. The user can choose which of these maps to view using a pull-down menu. These visual layers may be provided by a combination of dynamic model outputs and relevant imagery products. The user can generate an updated fertility prescription for that day.

In an embodiment, a server computer executes a back-end process to calculate and store a prescription creation model, which can include a soil and crop process model ("Fertility Model"), statistical or machine learning models for prescription rate calculations, imagery-based recommendations, or others, provided that they are sufficiently responsive to in-season conditions.

In some embodiments, computer-implemented numerical methods make this computationally fast and feasible for production, and for post-hoc aggregation of the pixel-level calculation into dynamic zones that are consistent with grower preferences and sprayer machine capabilities.

A previous limitation of digital models of crop nutrients has been the need for intensive computation when applied to sub-field spatial levels, presenting challenges for production software and real-time applications. Embodiments may implement a gridded fertility model that allows for computation to proceed at fine spatio-temporal resolution on thousands of grid cells across a field with a fraction of the computational burden over the baseline approach. The approach may use a locally-trained dynamic emulator of the full model. The method is also designed to translate back into traditional concepts of subfield management zones for ease of use.

Embodiments encompass computer-implemented processes to:

1. Determine a set of representative points of the field at which to evaluate the fertility model based on soil properties, hybrid choice, seeding density, and yield goal with the potential to include any layer at any resolution. Soil property data may come from public sources such as SSURGO or from privately prepared soil samples.

2. Create a statistical fit to the model outputs based on the computed grids and interpolate/extrapolate any of the Fertility Model outputs for all the grids in a field.

3. Create a post-hoc areal aggregation based on the spatial position and value of any given model output.

Display of graphical maps of agricultural fields, coded with color or other indicators of values of data pertaining to agronomy at high resolution, and updated on a daily basis or on demand by recalculating agronomy models with the high-resolution data, is disclosed. Map displays may include multiple layers that relate to different agronomy metrics, and GUI widgets that are programmed to receive selection of values indicating different field properties or layers to display. In an embodiment, a computer-implemented data processing method providing an improvement in efficient calculation of digital data representing physical properties of agricultural fields, the method comprising receiving digital input specifying a request to display a map image of a specified agricultural field for a particular day; in response to receiving the input, calculating an interpolated digital image of the specified agricultural field with a plurality of different field properties, by: dividing a digital map of the specified field into a plurality of grids each having a same size and a same area; obtaining, from digital storage, a plurality of data for the different field properties and assigning the data as covariates; grouping the grids into a specified number of clusters based on values of the covariates; pseudo-randomly selecting a specified number of one or more sample values in each of the clusters; evaluating a digital fertility model using the sample values and storing a plurality of output values from the digital fertility model;

interpolating a plurality of model values for the grids; generating and causing displaying a visual graphical image of the specified agricultural field including color pixels corresponding to each of the model values.

2. Example Agricultural Intelligence Computer System

2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
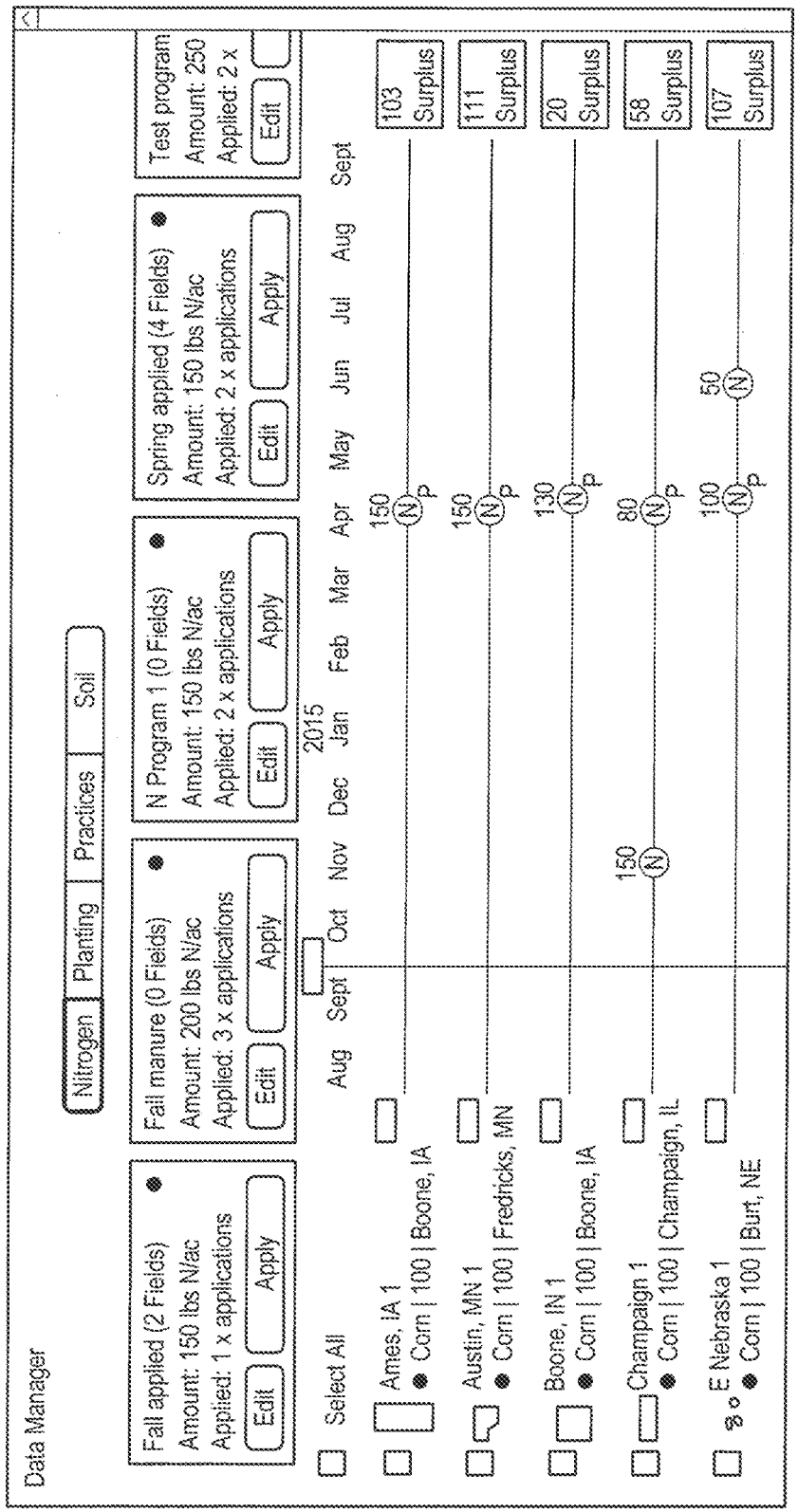
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, each of display update instructions 136 and gridded fertility model instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, display update instructions 136 and gridded fertility model instructions 138 may comprise a set of pages in RAM that contain instructions which when executed cause performing the target identification functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of display update instructions 136 and gridded fertility model instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
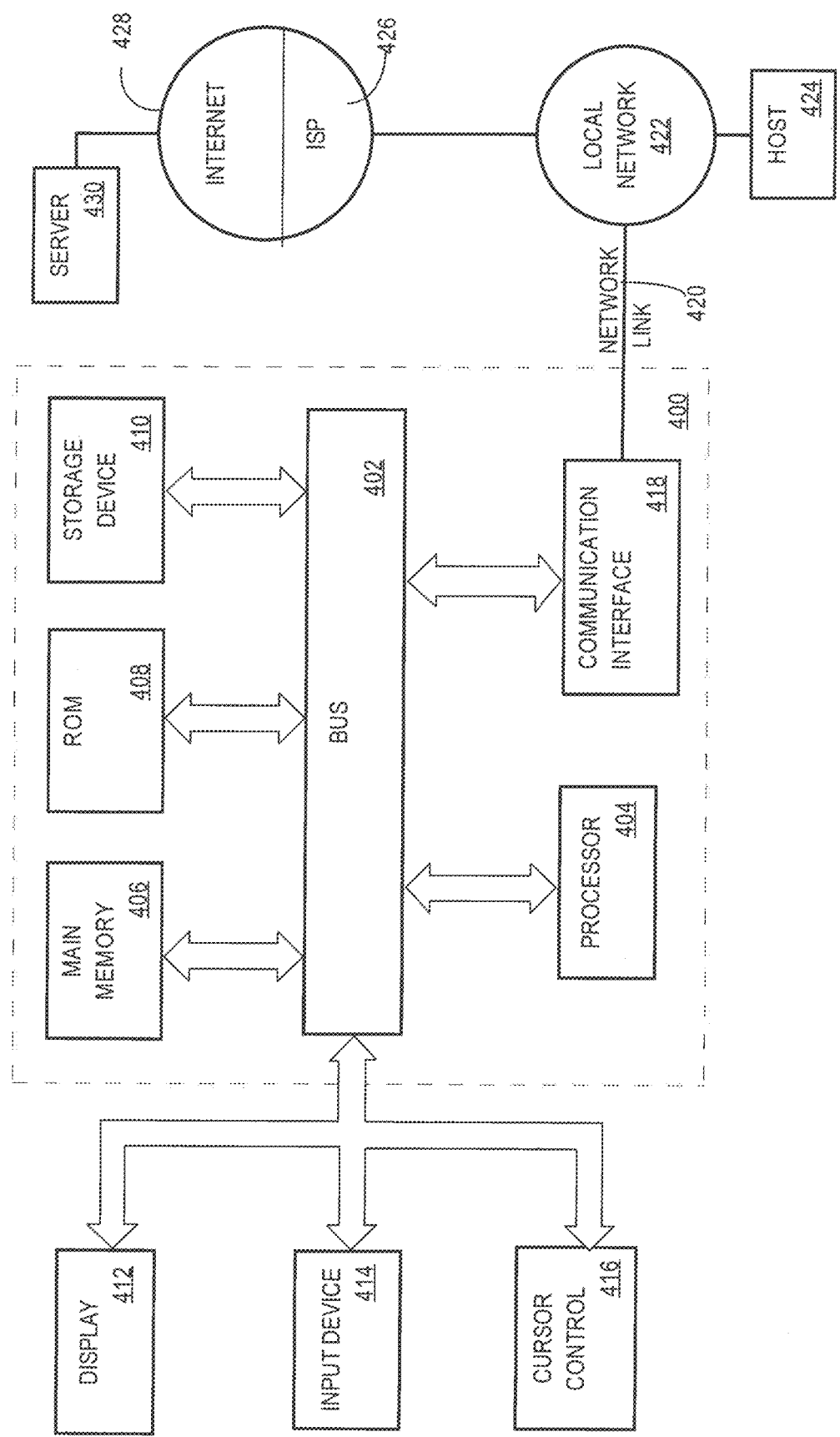
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat.

Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. application Ser. No. 15/551,582 and international application PCT/US16/29609, both filed Apr. 27, 2016, and their priority applications 62/154,207, filed Apr. 29, 2015, 62/175,160, filed Jun. 12, 2015, 62/198,060, filed Jul. 28, 2015, and 62/220,852, filed Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
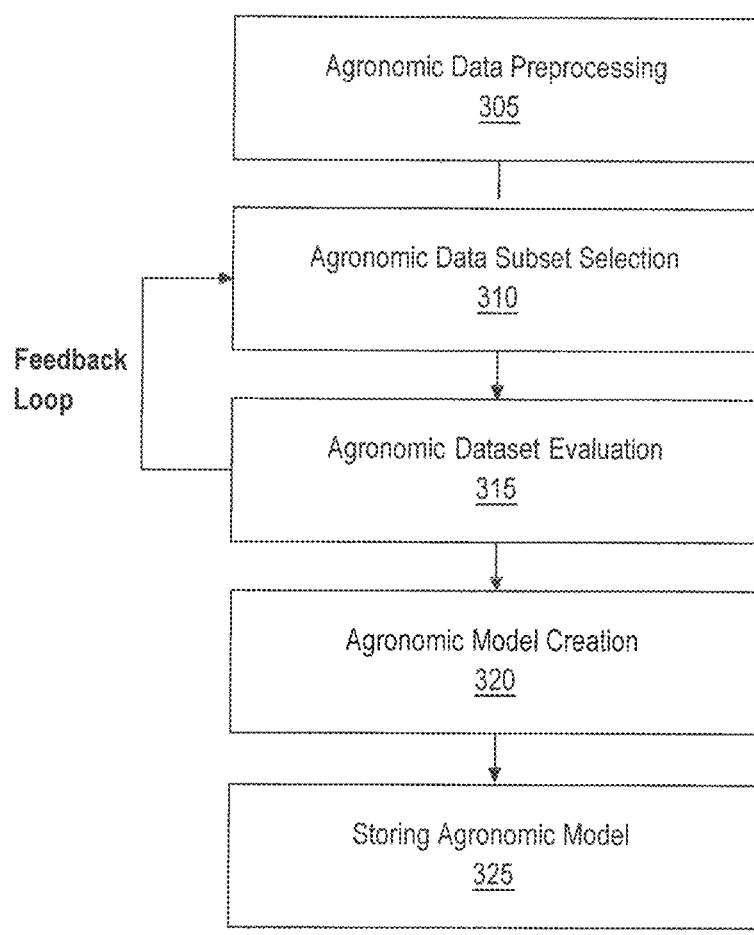
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Periodically Updated Displays of Fields

Figure 7A:
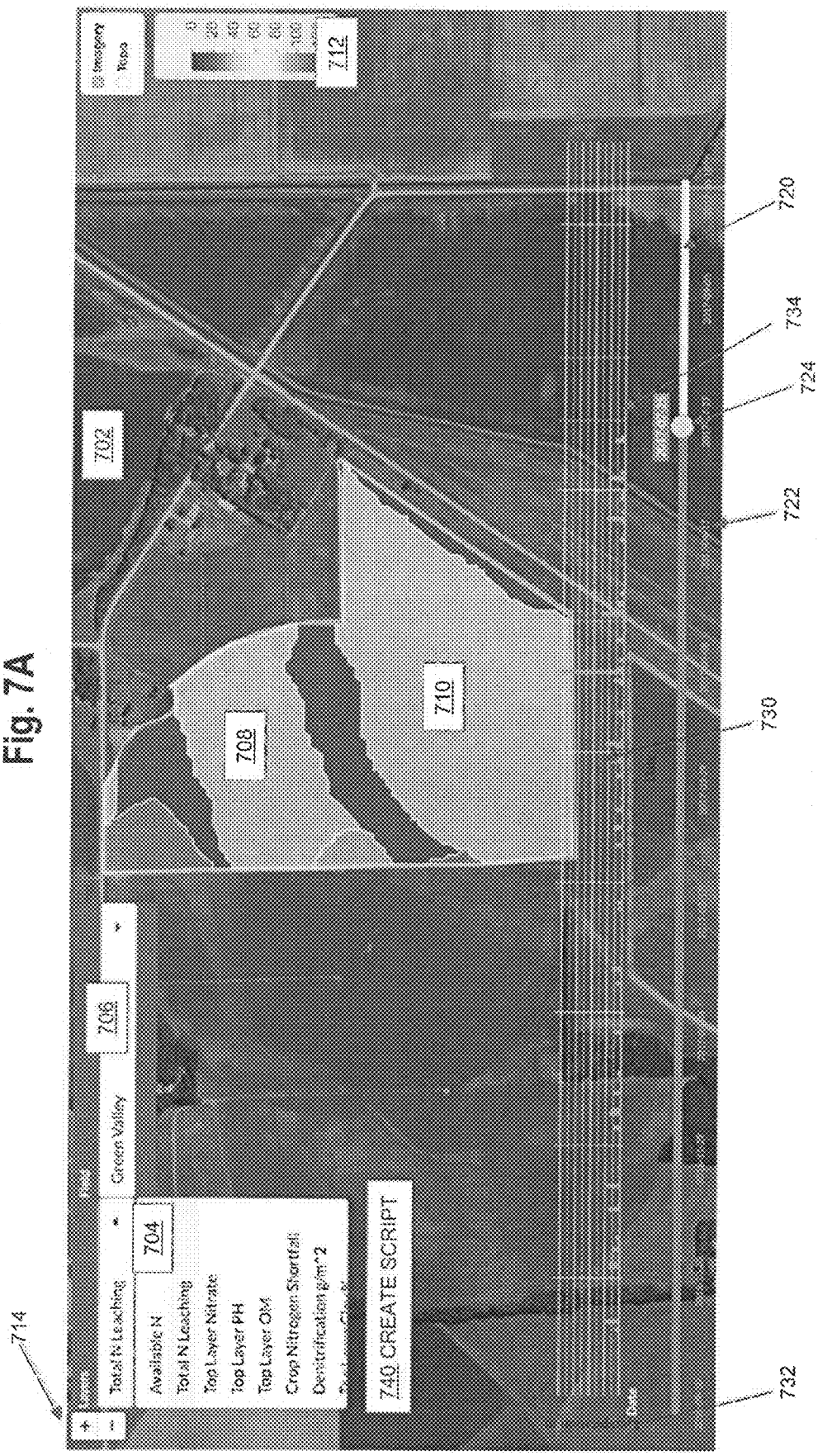
FIG. 7A illustrates an example computer-generated screen display to show a digital graphical map representation of a growing field in association with in-season applications, updated on a periodic basis.
Figure 7B:
FIG. 7B illustrates another example computer-generated screen display to show a digital graphical map representation of a growing field in association with in-season applications, updated on a periodic basis.
Figure 8A:
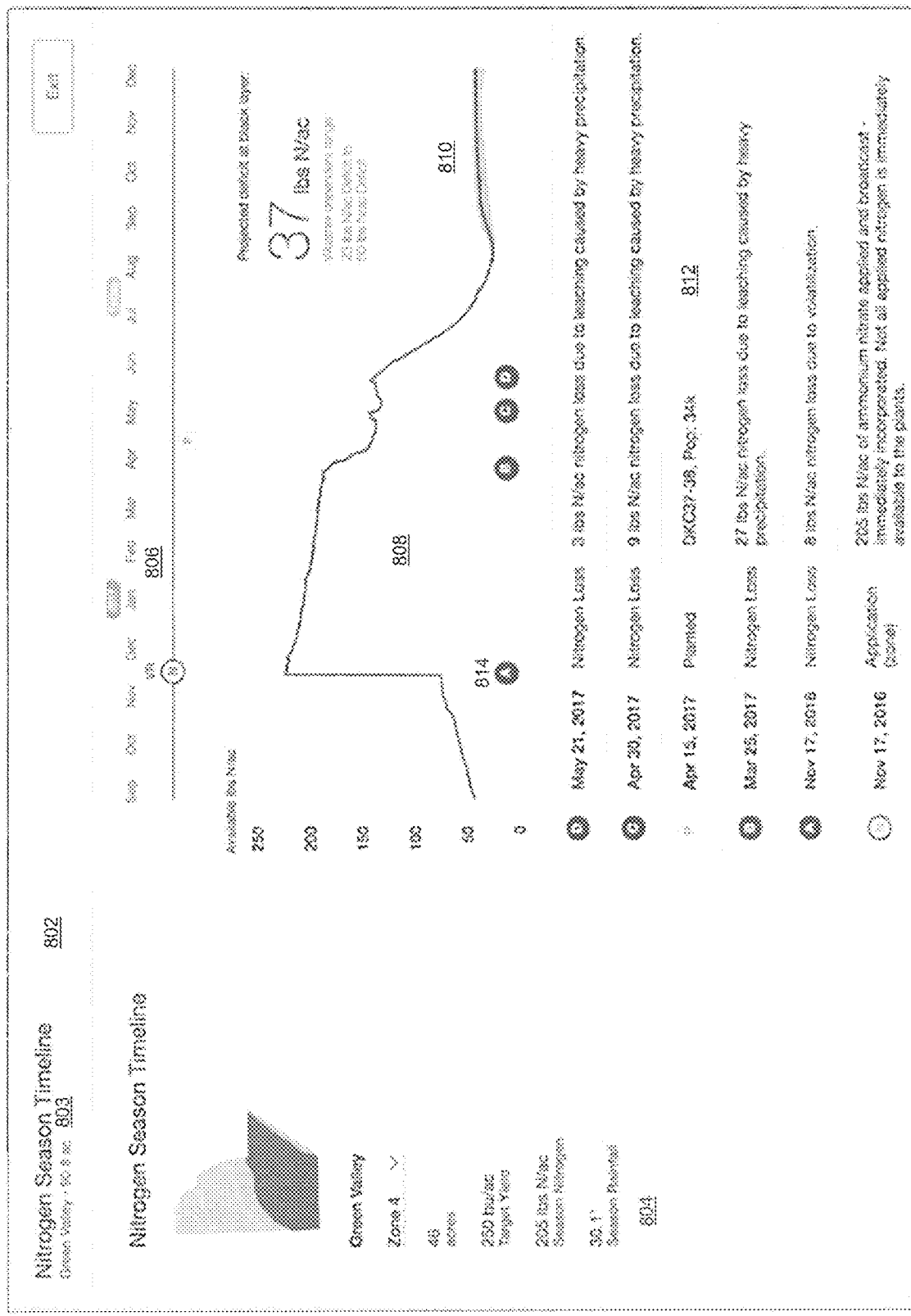
FIG. 8A illustrates an example computer-generated screen display to show a nitrogen season timeline as further detail in response to selection of a control in FIG. 7A.
Figure 8B:
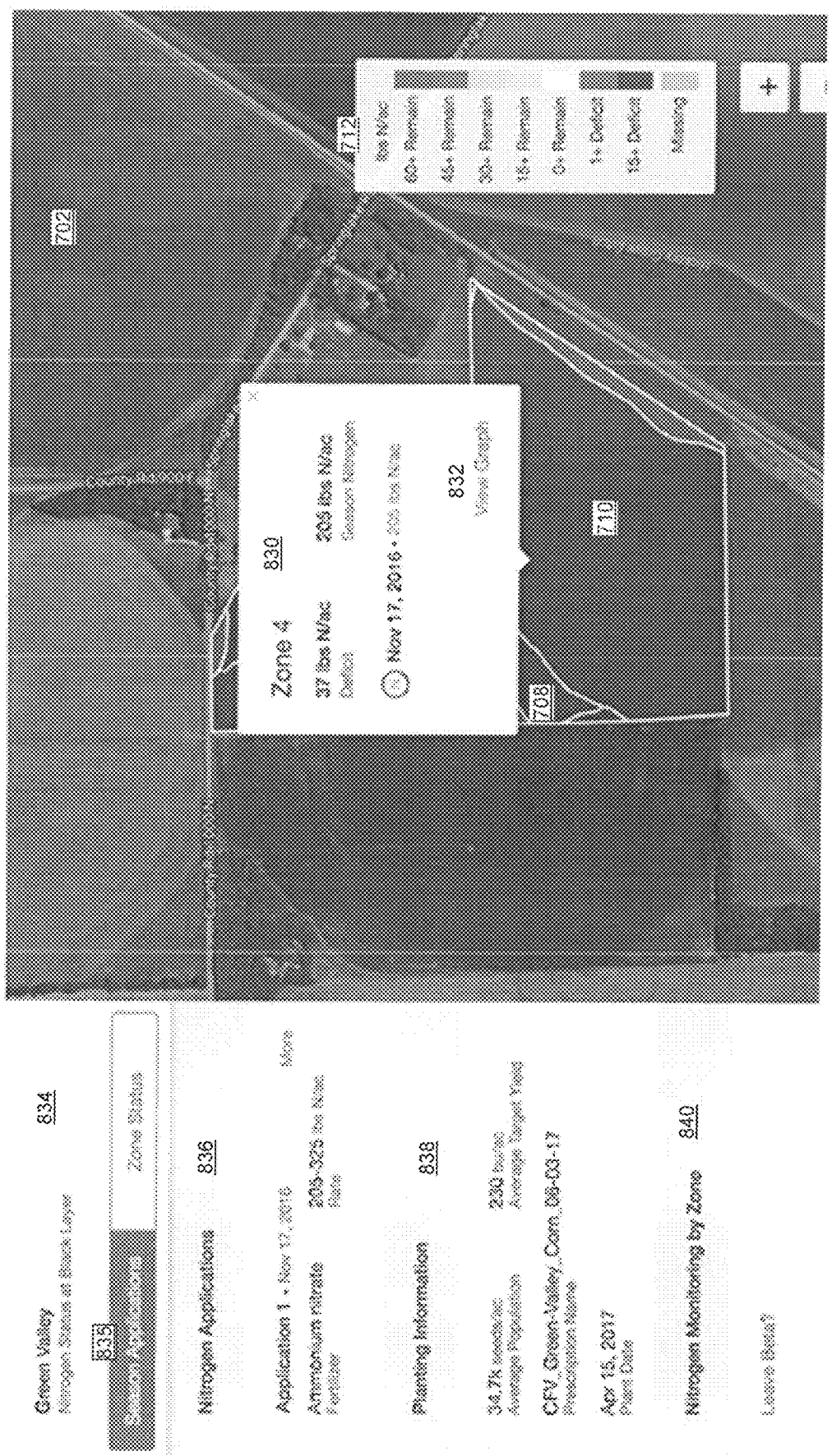
FIG. 8B illustrates an example computer-generated screen display to show a portion of nitrogen season data as an overlay.
Figure 10A:
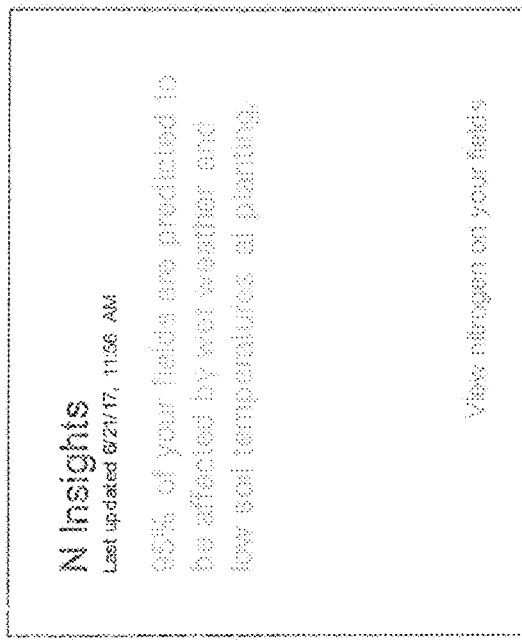
FIG. 10A, FIG. 10B, FIG. 10C illustrate panels that may be substituted into FIG. 9 under configuration control.
Figure 10B:
Figure 10C:
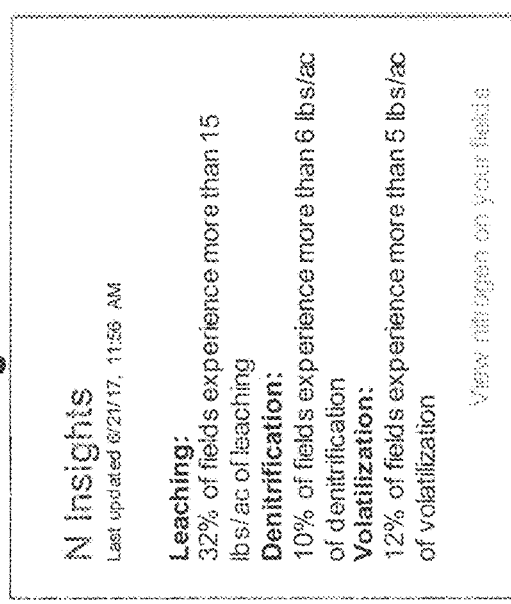
Figure 11:
FIG. 11 illustrates a list of notifications.

FIG. 7A illustrates an example computer-generated screen display to show a digital representation of a growing field in association with in-season applications, updated on a periodic basis. FIG. 7B illustrates another example computer-generated screen display to show a digital representation of a growing field in association with in-season applications, updated on a periodic basis. FIG. 8A illustrates an example computer-generated screen display to show a nitrogen (N) season timeline as further detail in response to selection of a control in FIG. 7A. FIG. 8B illustrates an example computer-generated screen display to show a portion of nitrogen season data as an overlay. FIG. 9 illustrates an example computer-generated screen display to show an overview of metric data relating to the field of FIG. 7A. FIG. 10A, FIG. 10B, FIG. 10C illustrate panels that may be substituted into FIG. under configuration control. FIG. 11 illustrates a list of notifications. In an embodiment, the functions that are described herein in relation to FIG. 7A, FIG. 8A, FIG. 9, FIG. 10A, FIG. 10B, FIG. 10C, FIG. 11 may be implemented using display update instructions 136.

Referring first to FIG. 7A, in one embodiment, a screen display 702 comprises a main window that displays under program control a digital map image comprising a geographic map view of a field 708 having a zone 710 in association with a layer widget 704 and a field selection widget 706. The field 708 may be specified via user input to select a specified field from among a plurality of different named fields for which data is stored in the system. Display 702 may be shown in device 104 (FIG. 1) for example with supporting calculations and display generation functions performed by computer system 130.

In the example of FIG. 7A, field selection widget 706 is set to "Green Valley" and that field is shown as field 708 in display 702. In an embodiment, field selection widget 706 is programmed to accept input to select a particular named field from among a plurality of different named fields shown in a pull-down list. In response to input selecting a particular named field, display update instructions 136 are programmed to retrieve data from the repository that defines the imagery, geometry, topology, and layer data for a plurality of different field properties or metrics for that field. Field properties or metrics may correspond to logical layers of a visual graphical map. Layer data may relate to any quantitative metric of interest in agronomy, including but not limited to N or other fertility metrics, elevation or other topological metrics, precipitation or other weather-related metrics, historic yield data, seed density, cost or other financial metrics, insurance, or debt values. With this approach, growers who manage multiple different fields can store all data for such fields in the repository and rapidly and efficiently obtain views similar to the example of FIG. 7A for all different fields that they manage.

Furthermore, in some embodiments, all stored data for a plurality of different fields may be aggregated to generate a plurality of aggregated metrics for an agricultural operation consisting of multiple fields and/or for a plurality of zones. Aggregation may comprise calculating mean values, sum values or other computations as appropriate to different metrics after obtaining results from an agronomy model. Resulting aggregated data for an operation may be displayed in lists, tables or other views.

In one embodiment, a key 712 is displayed in the main window near the field 708 and associates measurements of a metric with color values that are displayed for the field. For example, zone 710 may be colored blue in the main window and key 712 indicates that blue indicates N leaching of about 40 pounds of nitrogen per acre on a particular date or up to a particular date in various embodiments. Other zones of field 708 may be colored in different colors to correlate to other levels of nitrogen leaching.

In an embodiment, display update instructions 136 are programmed to display application panel 704 with a plurality of drop-down options for different metrics that can be displayed for field 708 or zone 710, on a pixel-by-pixel basis. Key 712 may dynamically change in form and content depending upon selections in the layer widget 704. In the example of FIG. 7A, since Total N Leaching is selected, the key 712 associates values for amounts of nitrogen leaching in the field 708 to different parts of the field on a pixel-by-pixel basis. If other metrics are selected using widget 704, then key 712 updates in response, to show different content in association with color values and/or have a different form.

In an embodiment, layer widget 704 may be integrated into a panel of other widgets for providing other input values that drive the appearance of display 702 and the data that is retrieved as a basis for the display. Referring to FIG. 7B, in one embodiment, a screen display 740 similar to display 702 comprises a graphical field 742 and field selection widget 706. Display 740 further comprises an input panel 744 that comprises a spatial view widget 746, layer widget 748, time series variable 750, script widget 752 and color palette widget 754. In this embodiment, a particular metric may be selected by providing input to layer widget 748 and selecting a desired metric from among a plurality of metrics in a pull-down menu. In the example of FIG. 7B, Yield Goal is the metric and key 712 is dynamically updated to show a scale and color codes corresponding to that metric.

Zoom controls 714 are programmed to receive input requesting to zoom display 702 in or out and to update displays of field 708 at different zoom scales based on the input. Any number of zones 710 may be shown as part of field 708, depending on values of metrics applicable to the field.

In an embodiment, display update instructions 136 are programmed to display a timeline slider bar 720 and data histogram 730 in screen display 702. In an embodiment, timeline slider bar 720 comprises a plurality of time labels 722 typically specifying different days and an interactive, graphically movable button 724. Time labels 722 need not specify every day for which data is stored but may be arranged according to intervals, e.g., every seven days or ten days may be identified. User input with a pointing device to button 724 may cause repositioning the button along the slider bar 720 to select different days as indicated by labels 722. In response, display update instructions 136 are programmed to re-display screen display 720 with updated data values and color coding for field 708 and zones 710, pixel-by-pixel, based upon retrieving and using data that has been stored in association with date values that correspond to the selected day.

While this example shows a time graph via slider bar 720, other embodiments may use other metrics in a similar slider bar, such as historical yield data, soil properties or zone personality. That is, a slider bar 720 could permit selective input of different values of historical yield data, soil properties or zone personality from among a range of those values, which may be numeric or symbolic. Thus a slider for historic yield data could indicate a range of numbers of bushels; soil properties could indicate chemical values or subjective attributes such as loamy, sandy, clay; zone personality could refer to fast-draining, other hydrological attributes, days of sun and so forth. Data for any of these metrics may be displayed in a range as part of a slider bar that permits selecting different specific values for the metric and then obtaining a map display of a field that matches the selected value.

In an embodiment, histogram 730 comprises a plurality of graphical bars that indicate a magnitude of digitally stored values for a metric identified in a histogram label 732. A position in the histogram 730 corresponding to the position of button 724 in slider bar 720 for time may be indicated using a distinctive line 734, icon or other graphical indication. In the example of FIG. 7A, histogram 730 shows amount of precipitation, but other embodiments may show other metrics in a histogram and screen display 720 may comprise a widget or control that is programmed to receive input to select different metrics and cause redisplaying histogram 730 for that metric. For example, in FIG. 7B, the time series variable widget 750 may be used to select the metric to show in histogram 730. Example metrics include weather, growth stage for a crop, heat stress and so forth. Bars in histogram 730 correspond to days corresponding to dates shown in timeline slider bar 720. User input with a pointing device to button 724 that causes repositioning the button along the slider bar 720 may cause, in response, display update instructions 136 to re-display histogram 730 with updated data values for corresponding periods, based upon retrieving and using data that has been stored in association with date values that correspond to the selected day.

In an embodiment, display 702 shows current field conditions and metric values on a daily basis. That is, data repositories that store data to drive display 702 and panel 704 are updated periodically as new data is available from satellite, radar and other sources, and calculated values may be computed daily so that grower views of display 702 are continuously current and updated. Recalculation may be performed at computer system 130 asynchronously, for example in overnight cron jobs, or on-the-fly in response to input at device 104 from the user 102. Typically, changes in data values received from device 104 will trigger a recalculation at computer system 130, which otherwise serves pre-calculated data. For example, input at device 104 that identifies a previously unreported sidedress application could trigger a recalculation of data because that application necessarily would have affected soil chemistry. Furthermore, display 702 implements multi-layer views so that updated graphics, color keying and computed metric values are available on a daily basis for a plurality of different metrics. For example, rather than displaying N as in FIG. 7A, display 702 could show yield of a particular crop, soil moisture or other metrics. In any of these embodiments, the calculation techniques described herein in section 4 may be used to achieve daily, quasi-live or live recalculation and updating of displays.

In some embodiments, graphical elements for field 708 and zones 710 may be associated with hyperlinks which, when selected, cause display update instructions 136 to retrieve and display details of prescription, application, satellite or radar data that served as a foundation for calculating values that resulted in the color coding of the field and zones in display 702. Tables, lists or other display formats may be used depending on the foundation data, which may be retrieved from data repository 160 (FIG. 1). A benefit of this approach is that growers can cross-check data in panel 704 against their own records, which improves confidence that the coded display of field 708 and/or zones 710 is accurate.

In an embodiment, screen display 702 is programmatically linked to a prescription tool that is programmed to accept input for defining a fertilizer prescription via a Create Script button 740 or widget. When selected, button 740 causes display update instructions 136 to generate and cause displaying a graphical screen that accepts input for defining and scheduling a prescription. In another embodiment, as seen in FIG. 7B, script widget 752 may be selected to cause displaying an input panel that is programmed to accept data for a prescription. Input may specify an application date, product to be applied, amount to apply and other details. In response, display update instructions 136 are programmed to automatically create, store and populate a script object in the data repository 160 for network communication to treatment apparatus to drive the treatment apparatus in the field. For example, script objects may be created and stored in portable digital document formats such as XML, JSON and so forth. This approach permits a grower to review current conditions of fields and then immediately act upon the data by creating and scheduling a prescription for field treatment that responds to the data that was visualized.

In some embodiments, display update instructions 136 are programmed to generate and display a forecast of the impact that the newly created prescription will have on the field. For example, display update instructions 136 are programmed to interact with agronomy modeling instructions to apply data defining the prescription to mathematical agronomy models, generating output representing yield, crop nitrogen shortfall, or other metrics, which would occur or result if the new prescription actually was implemented. The agronomy modeling techniques disclosed in U.S. Pat. No. 9,519,861 B1 may be used in an implementation. This approach permits a grower to experiment with different prescriptions to determine an optimized prescription.

FIG. 8A illustrates an example computer-generated screen display to show a nitrogen season timeline as further detail in response to selection of a control in FIG. 7A. FIG. 8A includes a forecasting component. In an embodiment, a screen display 802 comprises a title 803, a data summary panel 804, a timeline 806, a graph 808 with a forecast graph region 810, and a notification panel 812.

In an embodiment, title 803 identifies the previously selected field (FIG. 7A, FIG. 7B). The data summary panel 804 is programmed to display basic data about the field such as name, zone, size, target yield, nitrogen applied to date, and rainfall to date. The timeline 806 is programmed to display application events that have occurred in the past, using icons such as N in association with labels for months of the year. In an embodiment, timeline 806 includes a graphical indication of the current day, such as a colored line. The graph 808 comprises a line graph in which the X axis is time corresponding to the timeline, and the Y axis is a metric corresponding to title 803, such as available N in the field. Graph 808 may include one or more icons 814 that specify different events for which corresponding notifications appear in panel 812. Labels such as A, B, C, D correlate to icons in the panel 812 that identify events or alerts. In an embodiment, forecast graph region 810 comprises a calculated prediction of a metric, such as N deficit at the black layer stage of corn in the example of FIG. 8A.

A portion of the data shown in FIG. 8A may be displayed as an overlay, in some embodiments. FIG. 8B illustrates an example computer-generated screen display to show a portion of nitrogen season data as an overlay. In the example of FIG. 8B, in screen display 702 user input from a pointing device has hovered or paused over zone 710 and in response, display update instructions 136 cause displaying a sub window 830 with metrics for that zone. The specific data in sub window 803 may vary in different embodiments but typical metrics may include zone name, N deficit value, total N application to date, and the last N application event as in the example of FIG. 8B. In an embodiment, a View Graph link 832 is programmed to cause displaying other details such as the display of FIG. 9, discussed elsewhere herein.

In an embodiment, screen display 702 as seen in FIG. 8B also may comprise a status panel 834 that is programmed to display a plurality of sub panels 836, 838, 840 that show other metric values. A status selector 835 is programmed to accept input specifying season applications or zone status and the specific titles and contents of sub panels 836, 838, 840 may be dynamically updated in response to different selections with the status selector. In the example of FIG. 8B, "Season Applications" is selected with selector 835 and therefore sub panels 836, 838, 840 show data relating to in-season applications.

In some embodiments, display update instructions 136 are programmed to accept input at button 724 to move slider bar 720 to a date in the future. In response, display update instructions 136 are programmed to retrieve data from the repository comprising forecast weather data and use that data in the agronomy model to predict values for metrics that are displayed in display 702.

In some embodiments, the input panel 744 (FIG. 7B) may be programmed with widgets that can cause changes in other aspects of the display 740. For example, spatial view widget 746 may be programmed to accept input specifying a particular form of spatial display. In the example of FIG. 7B, Grid is selected and therefore field 742 is shown as a grid of colored squares. Other polygons may be used in displaying field 742 and squares are not required. Furthermore, color palette widget 754 is programmed to accept input specifying a color scheme for display of field 742. The selection of a color palette may vary the colors that appear in key 712 and that are used in polygons or other aspects of displaying field 742. Different colors may use colors that gradually change across a color spectrum or contrasting colors that tend to emphasize the differences in zones 710.

In some embodiments, the displays of FIG. 7A, FIG. 7B, FIG. 8A may be obtained by selecting controls from an overview display. FIG. 9 illustrates an example computer-generated screen display providing an overview display. In an embodiment, screen display 902 comprises a plurality of sub panels 904, 906, 908, 910, 912, 914 that provide a subset of data pertaining to different aspects of agronomy and that act as selectable entry points to obtain other displays. For example, Nitrogen Status panel 906 may be used to obtain displays such as FIG. 8A by selecting a link 915. In response to input indicating selection of link 915, display update instructions 136 are programmed to generate and cause displaying the display of FIG. 8A, with appropriate server-side calculations as needed. In another example, in response to input selecting link 916 of Field Health panel 908, display update instructions 136 are programmed to generate and cause displaying the displays of FIG. 7A or FIG. 7B.

Any of the sub panels 904, 906, 908, 910, 912, 914 may be dynamically updated in response to events occurring in fields in real time, based upon updates to calculations on the server side, or based on user input to settings values that can be accessed via a Settings link 920. For example, FIG. 10A, FIG. 10B, FIG. 10C illustrate sub panels that can be displayed as part of FIG. 9, rather than Nitrogen Status, to provide different data relating to past weather, forecast future weather, and other metrics.

In some embodiments, display update instructions 136 are programmed to generate and transmit notifications and/or alerts to a user account or to device 104. The display update instructions 136 may be programmed to use thresholding, severity tests, and/or stochastic techniques that rate limit the number of notifications and/or alerts that are transmitted to determine when and what to transmit. FIG. 11 illustrates a list of notifications. In an embodiment, FIG. 9 includes a Notifications sub panel 912 with a link 922 to View All notifications; in response to input selecting the View All notifications, FIG. 11 may be displayed. In an embodiment, a screen display 1100 of FIG. 11 includes a plurality of rows 1104, 1106 each identifying a particular notification and associated with date values 1108, 1110. There may be any number of date values and notifications. Rows 1104, 1106 comprise hyperlinks which when selected cause displaying detail for the associated notification, alert or report. In an embodiment, a return link 1112 may be selected to cause transitioning back to the overview display of FIG. 9.

Using these approaches, field map views of the types illustrated herein may be periodically re-generated and displayed on demand, on a daily basis or according to other relatively short periods. In effect, the grower obtains a live view of field conditions based on the most recently available data and calculations that have been executed on demand or a short time before the requested display. The use of high spatial resolution data as a foundation for the displays results in highly accurate displays. Growers are capable of obtaining data efficiently and graphically to assist in conclusions such as seeing that a sidedress recommendation may evolve daily with weather, that fertility zones could change shape and size depending on timing, and so forth.

4. Gridded Fertility Model

Data for the metric values that are displayed as part of layers in FIG. 7A, FIG. 7B typically is stored using fine resolution. For example, latitude-longitude data defining a field and/or a zone could be stored to thousandths of degrees of resolution. Rainfall could be stored to hundredths of inches for each hour of days of many years. Consequently, dynamically updating the displays of FIG. 7A, FIG. 7B on demand or on a daily or other periodic basis, in the manner described above to result in essentially live field displays for growers, can require significant computation power. The disclosed approaches effectively locally emulate the execution of an agronomy model on all data points associated with a field by executing the agronomy model only on sampled data points from clusters defined for a field and interpolating data values for which agronomy model output is not actually obtained.

Figure 12:
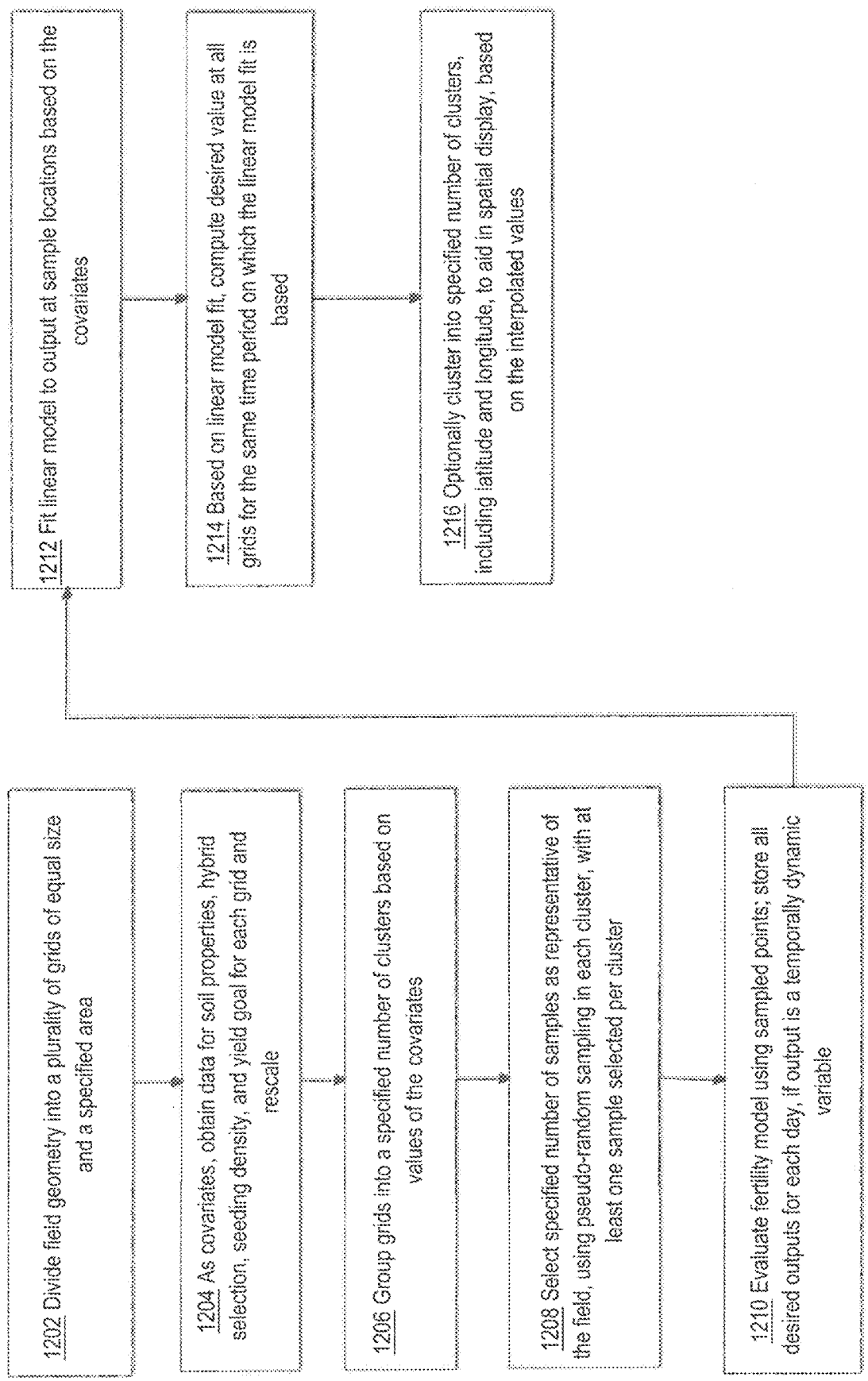
FIG. 12 illustrates an algorithm for computation of data points to support generating and updating the display of FIG. 7A, FIG. 7B or other similar displays of fields.

FIG. 12 illustrates an algorithm for computation of data points to support generating and updating the display of FIG. 7A, FIG. 7B or other similar displays of fields. In an embodiment, the functions that are described herein in relation to FIG. 12 may be implemented using gridded fertility model instructions. In general, FIG. 12 and the description herein provides the methodology to feasibly compute and visualize high spatial resolution outputs based on a small number of representative points. The techniques herein permit evaluating a fertility model at a subsample of grid locations of a field and predict values for all other grid locations in the field. Before this process, using the model of U.S. Pat. No. 9,519,861 B1 for example could be computationally infeasible for data at the resolution or grid sizes described below, or would require undesirable computational costs using public cloud computing facilities. For example, fields of FIG. 7A, FIG. 7B could have over 1,000 cells using fine resolution data and executing the model of the above-noted patent would take undesirable amounts of time and excessive costs. The approaches herein permit executing the fertility model far fewer times, effectively capturing the data variability of a field while using as few samples as possible.

In an embodiment, at step 1202, field geometry is divided into a plurality of equally sized cells or grids of a specified or predefined area. For example, digital map data for a specified field 708 is divided into a plurality of grids consisting of portions of data corresponding to small parts of the field, typically much smaller than zone 710. Grids have the same size and same area. An example individual grid size is 3 m×3 m. Digitally stored configuration data may specify the grid area to be used. In some embodiments, grids may cross a zone 710 and calculation of data based on grids is performed independently of the use of zones in displays or for other purposes. One reason for this approach is that input data sources typically use all different scales and locations and are not correlated with grids or zones.

At step 1204, data for soil properties (both public (SSURGO) and private (user soil samples)), hybrid choice, seeding density, and yield goal (with the potential to include any layer at any resolution) are obtained for every grid and are rescaled to a normalized range or scale, for example, to 0-1. The data is assigned or treated in memory as covariates for purposes of subsequent steps. Obtaining data in step 1204 may comprise retrieving data from storage and/or receiving input specifying a file name of custom data or privately prepared data. Or, obtaining data may comprise issuing one or more queries to APIs of online servers that can respond with data files, response messages in XML or other formats, and the like.

At step 1206, the grids are grouped into a specified or predefined number of clusters based on the values of the covariates. Clusters effectively represent a plurality of grid cells that have similar values across covariates. In one embodiment, the k-means clustering algorithm may be used.

At step 1208, a specified or predetermined number of samples is selected to be representative of the field, using pseudo-random or truly random sampling within each cluster, while ensuring that each cluster has at least one sample or representative. Step 1208 may comprise iterating through steps of selecting a sample, determining whether the sample value is representative of a cluster, and repeating the sampling to add additional samples until such time as enough samples have been selected to be representative. Depending on the size of the field and the variability within a field with respect to soil composition, topology or other values, each cluster may have from one to about twenty or thirty samples. Other embodiments could use larger maximum numbers of samples, such as one hundred samples. Available computing power also may be a factor in setting the maximum number of samples per cluster.

At step 1210, a fertility model is evaluated for all samples or representative points of a cluster. For example, with thirty samples in a cluster, the fertility model is evaluated thirty times, once for each sample point. The agronomy modeling techniques disclosed in U.S. Pat. No. 9,519,861 B1 may be used in an implementation. All desired outputs are stored for every day if output is a temporally dynamic variable. This approach is not limited to fertility model outputs, and can accommodate any desired quantifiable value, such as any nitrogen script. It will be apparent that evaluating a computer-implemented fertility model only for data sampled from clusters will involve evaluating a far smaller number of data points than if all data corresponding to all grids were evaluated. The degree of efficiency achieved in this step may vary depending on the number of samples per cluster that are selected or specified.

Interpolation then is used to obtain a plurality of interpolated model values for the grids to substitute for actual evaluation of the fertility model against all actual grid data.

At step 1212, a linear model is fit to the output from the agronomy model, for one output or state variable at a time, or one script at a time, for a single day at a time, at the representative sample locations based on the covariates. The outputs or state variables may correspond to the layer metrics described above for FIG. 7A, FIG. 7B. This step is not limited to linear models, and any statistical or machine learning algorithm may be used. Use of a linear model provides a fast, computationally efficient method and has good performance.

At step 1214, based on the linear model fit, the process computes the desired value at all of the grids for the same time period that the linear model fit is based on. As substitutes for step 1212, 1214, other interpolation methodologies may be used.

At this stage, per-pixel values are available for all pixels in a graphical map of a field. The method may comprise generating and causing displaying a visual graphical image of the specified agricultural field including color pixels corresponding to each of the interpolated model values. This high-resolution output data may be transformed in several different ways depending on the application for which the data will be used. As an example, at step 1216, optionally, based on the interpolated values, the process clusters the data into a predefined number of clusters. In effect, this step coarsens data that otherwise has high resolution. One reason to perform step 1216 is to prepare data for output to field equipment that operates using lower resolution. For example, assume that existing field equipment for application of fertilizer has a working resolution of 20 m×20 m for movement within a field or determining where to apply N; with this equipment, supplying data at 3 m×3 m resolution would be unusable or inefficient. In some embodiments, at step 1216 latitude and longitude values are included to aid in spatial displays as seen in FIG. 7A, FIG. 7B.

Consequently, high-resolution data from the sources identified above can be efficiently used as a foundation to compute pixel-by-pixel values for a variety of agronomy metrics and then present the resulting data visually on a rapidly updated basis. The disclosed techniques require fewer CPU cycles, memory, transient disk storage or buffer storage because less data is used in agronomy model calculations yet all pixel values for a graphical map for a particular metric can be calculated via interpolation. Because the computational methods are efficient and use data sampling in combination with accurate interpolation, daily or otherwise frequent updates can be made to field map displays, effectively providing growers with live views of actual or expected field conditions. Thus, these techniques provide the benefit of generating data that has not been available before in a manner that improves computer efficiency and use of resources.

Figure 13:
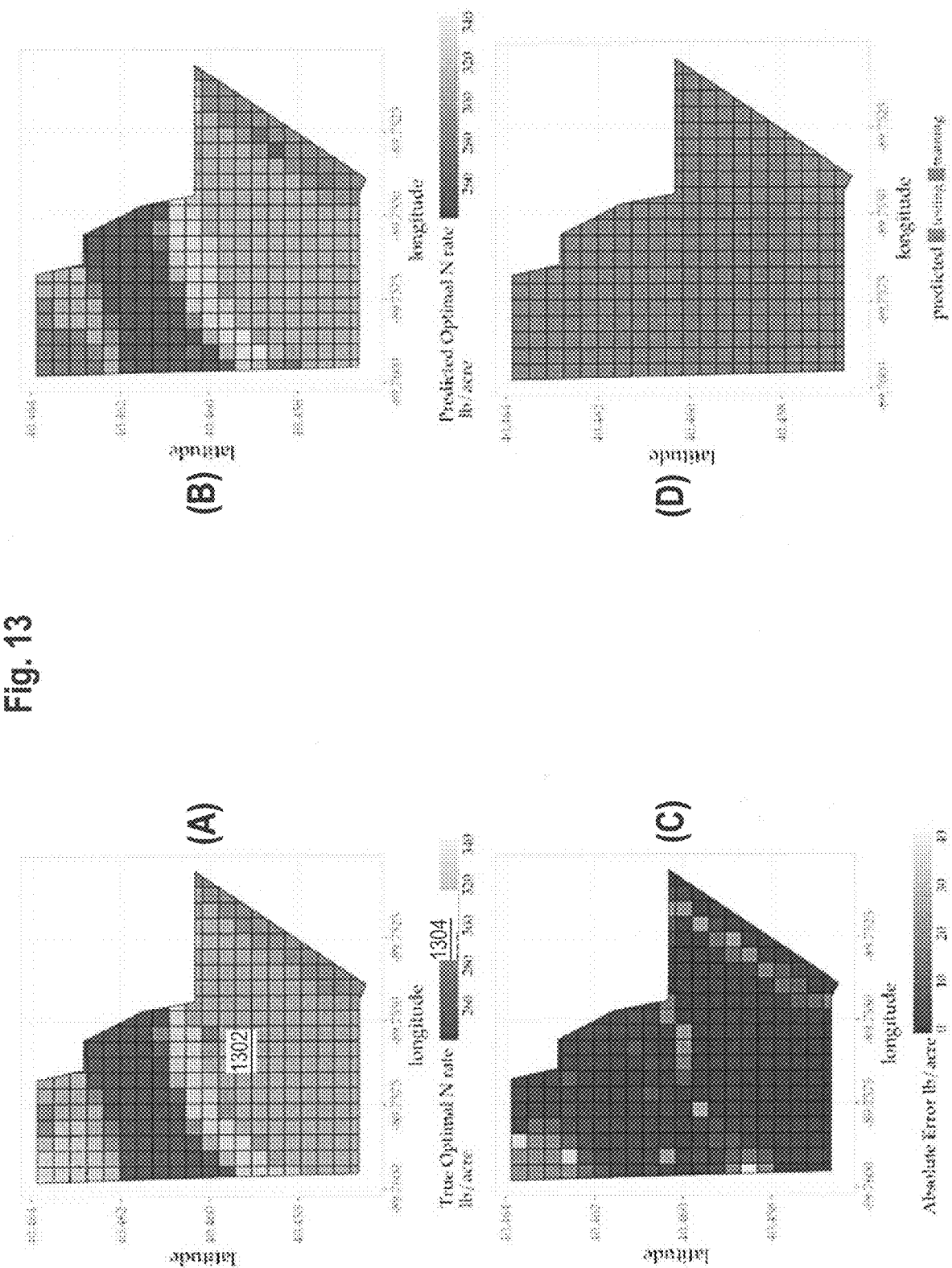
FIG. 13 is a four-part illustration showing a hypothetical field, predicted values using the techniques herein, error values and sampled values.

The inventors have fully worked this algorithm using example data. FIG. 13 is a four-part illustration showing a hypothetical field, predicted values using the techniques herein, error values and sampled values. In one experiment, after filtering for reasonable management practices, 100 fields and 729 corresponding zones were analyzed. The "Green Valley" field was divided into 282 grids and the fertility model was evaluated at each of the grids. The algorithm described above was used at each grid to find the optimal sidedress N-rate that would lead to 15 lb/acre N-status. After the optimal N-rate was found, a treed Gaussian process model was fit using a subset of the 282 grids. The model was fit based on the following covariates: Mean top foot OM %; Mean to foot porosity; Mean top foot Ph. The two different training sets that were considered were a random sample of 10% of the grids and taking every 4th grid point. Out of sample prediction was conducted and then performance metrics were calculated.

In the example of FIG. 13, view (A) illustrates actual data values used in an experiment. A hypothetical field 1302 is divided into a plurality of grid cells, for which corresponding latitude and longitude values are shown in axes. True optimal N rate data for each grid, in lb/acre, is shown in scale 1304 with color coding or shade coding to correlate different values to different locations in the field view. In general, grid cells with a lower true optimal N rate are darker in color and grids with a higher value are lighter in color. This represents input data from which clusters and representative sample values were selected.

View (B) shows predicted optimal N rate values for the same field and all cells in the same field after using the process of FIG. 12 and an agronomy model.

View (C) shows absolute error in lb/acre that occurred in the output of view (B) as compared to view (A).

View (D) illustrates the same map as in views (A), (B), (C), coded to indicate which grids were selected for sampling, and which grids were non-selected and therefore used interpolated values in view (B). A first color illustrates about 10% of grids that were selected for sampling, and a second color illustrates about 90% of grids that had values interpolated via the process of FIG. 12.

Collectively these views show that a fraction of the high-resolution data for a field can be processed using the method of FIG. 12 and result in predicted or interpolated values for a majority of field grids with an acceptable level of error.

What is claimed is:

1. A computer-implemented data processing method providing an improvement in efficient calculation of digital data representing physical properties of agricultural fields, the method comprising:
receiving digital input specifying a request to display a map image of a specified agricultural field for a particular day;
in response to receiving the input, calculating an interpolated digital image of the specified agricultural field with a plurality of different field properties, by:
dividing a digital map of the specified field into a plurality of grids each having a same size and a same area;
obtaining, from digital storage, a plurality of data for the different field properties and assigning the data as covariates;
grouping the grids into a specified number of clusters based on values of the covariates;
pseudo-randomly selecting a specified number of one or more sample values in each of the clusters;
evaluating a digital fertility model using the sample values and storing a plurality of output values from the digital fertility model;
interpolating a plurality of model values for the grids;
generating and causing displaying a visual graphical image of the specified agricultural field including color pixels corresponding to each of the model values;
wherein the method is performed using one or more digital electronic computing devices.

2. The method of claim 1, further comprising, at a plurality of different times, repeating the receiving, calculating, generating and causing displaying for a plurality of different days, including obtaining from the digital storage updated data for the different field properties.

3. The method of claim 1, the different field properties comprising any one or more of soil properties, hybrid selection, seeding density, and yield goal.

4. The method of claim 1, the calculating further comprising fitting a linear model to the plurality of output values from the digital fertility model; based on the linear model fit, computing the model values at all grids for the same period on which the linear model fit is based.

5. The method of claim 4, the calculating further comprising clustering the model values into a specified number of second clusters that include latitude and longitude values.

6. The method of claim 1, further comprising:
receiving second digital input specifying a request to create a fertilizer prescription;
automatically generating and storing a fertilizer prescription for the specified agricultural field based upon the model values that have been displayed.

7. The method of claim 1, further comprising:
receiving second digital input specifying a request to create a fertilizer prescription for a specified zone of the specified agricultural field;
automatically generating and storing a fertilizer prescription for the specified zone of the specified agricultural field based upon the model values that have been displayed and that are in the specified zone.

8. The method of claim 1, further comprising generating and causing displaying a timeline slider bar comprising an interactive movable slider button in a graphical user interface, and wherein the receiving digital input specifying a request to display a map image of a specified agricultural field for a particular day comprises receiving input in the graphical user interface to slide the button to a position representing the particular day.

9. The method of claim 8, further comprising generating and causing displaying a visual graphical histogram near the timeline slider bar and comprising a plurality of different histogram bars, at least some of the histogram bars corresponding to and vertically aligned with day identifiers of the timeline slider bar.

10. The method of claim 1, further comprising generating and causing displaying a graphical user interface widget that is programmed to receive input specifying a selected map layer corresponding to one of the different field properties, and in response, updating the visual graphical image of the specified agricultural field to visually display a plurality of pixels for a particular field property that corresponds to the selected map layer.

11. The method of claim 10, further comprising repeating the receiving, calculating, generating and causing displaying for the particular field property that corresponds to the selected map layer, including obtaining from the digital storage updated data for the particular field property.

12. A non-transitory computer-readable data storage medium storing one or more sequences of instructions which when executed cause performing a computer-implemented data processing method providing an improvement in efficient calculation of digital data representing physical properties of agricultural fields, the method comprising:

receiving digital input specifying a request to display a map image of a specified agricultural field for a particular day;

in response to receiving the input, calculating an interpolated digital image of the specified agricultural field with a plurality of different field properties, by:

dividing a digital map of the specified field into a plurality of grids each having a same size and a same area;

obtaining, from digital storage, a plurality of data for the different field properties and assigning the data as covariates;

grouping the grids into a specified number of clusters based on values of the covariates;

pseudo-randomly selecting a specified number of one or more sample values in each of the clusters;

evaluating a digital fertility model using the sample values and storing a plurality of output values from the digital fertility model;

interpolating a plurality of model values for the grids;

generating and causing displaying a visual graphical image of the specified agricultural field including color pixels corresponding to each of the model values.

13. The non-transitory computer-readable data storage medium of claim 12, further comprising instructions which when executed using the one or more processors cause the one or more processors to perform, at a plurality of different times, repeating the receiving, calculating, generating and causing displaying for a plurality of different days, including obtaining from the digital storage updated data for the different field properties.

14. The non-transitory computer-readable data storage medium of claim 12, the different field properties comprising any one or more of soil properties, hybrid selection, seeding density, and yield goal.

15. The non-transitory computer-readable data storage medium of claim 12, the calculating instructions further comprising instructions which when executed using the one or more processors cause the one or more processors to perform fitting a linear model to the plurality of output values from the digital fertility model; based on the linear model fit, computing the model values at all grids for the same period on which the linear model fit is based.

16. The non-transitory computer-readable data storage medium of claim 15, further comprising instructions which when executed using the one or more processors cause the one or more processors to perform the calculating by clustering the model values into a specified number of second clusters that include latitude and longitude values.

17. The non-transitory computer-readable data storage medium of claim 12, further comprising instructions which when executed using the one or more processors cause the one or more processors to perform:

receiving second digital input specifying a request to create a fertilizer prescription;

automatically generating and storing a fertilizer prescription for the specified agricultural field based upon the model values that have been displayed.

18. The non-transitory computer-readable data storage medium of claim 12, further comprising instructions which when executed using the one or more processors cause the one or more processors to perform:

receiving second digital input specifying a request to create a fertilizer prescription for a specified zone of the specified agricultural field;

automatically generating and storing a fertilizer prescription for the specified zone of the specified agricultural field based upon the model values that have been displayed and that are in the specified zone.

19. The non-transitory computer-readable data storage medium of claim 12, further comprising instructions which when executed using the one or more processors cause the one or more processors to perform: generating and causing displaying a timeline slider bar comprising an interactive movable slider button in a graphical user interface, and wherein the receiving digital input specifying a request to display a map image of a specified agricultural field for a particular day comprises receiving input in the graphical user interface to slide the button to a position representing the particular day.

20. The non-transitory computer-readable data storage medium of claim 19, further comprising instructions which when executed using the one or more processors cause the one or more processors to perform: generating and causing displaying a visual graphical histogram near the timeline slider bar and comprising a plurality of different histogram bars, at least some of the histogram bars corresponding to and vertically aligned with day identifiers of the timeline slider bar.

21. The non-transitory computer-readable data storage medium of claim 12, further comprising instructions which when executed using the one or more processors cause the one or more processors to perform: generating and causing displaying a graphical user interface widget that is programmed to receive input specifying a selected map layer corresponding to one of the different field properties, and in response, updating the visual graphical image of the specified agricultural field to visually display a plurality of pixels for a particular field property that corresponds to the selected map layer.

22. The non-transitory computer-readable data storage medium of claim 21, further comprising instructions which when executed using the one or more processors cause the one or more processors to perform repeating the receiving, calculating, generating and causing displaying for the particular field property that corresponds to the selected map layer, including obtaining from the digital storage updated data for the particular field property.

\* \* \* \* \*